Oct. 11, 1955 W. J. HARSHBARGER 2,720,554

CONTINUOUS FILM MOTION TELEVISION CAMERA
WITH SHRINKAGE COMPENSATION

Filed Nov. 30, 1949 3 Sheets-Sheet 1

INVENTOR.
WALTER J. HARSHBARGER
BY Kenyon & Kenyon
HIS ATTORNEYS

Oct. 11, 1955 W. J. HARSHBARGER 2,720,554

CONTINUOUS FILM MOTION TELEVISION CAMERA
WITH SHRINKAGE COMPENSATION

Filed Nov. 30, 1949 3 Sheets-Sheet 2

INVENTOR.
WALTER J. HARSHBARGER
BY Kenyon & Kenyon
HIS ATTORNEYS

Oct. 11, 1955 W. J. HARSHBARGER 2,720,554

CONTINUOUS FILM MOTION TELEVISION CAMERA WITH SHRINKAGE COMPENSATION

Filed Nov. 30, 1949 3 Sheets-Sheet 3

INVENTOR.
WALTER J. HARSHBARGER
BY Kenyon & Kenyon
HIS ATTORNEYS

United States Patent Office 2,720,554

Patented Oct. 11, 1955

2,720,554

CONTINUOUS FILM MOTION TELEVISION CAMERA WITH SHRINKAGE COMPENSATION

Walter J. Harshbarger, New York, N. Y.

Application November 30, 1949, Serial No. 130,134

4 Claims. (Cl. 178—7.2)

My invention relates to a method and apparatus for the televising of standard motion picture sound film by television stations and more particularly to the televising of motion picture sound film whose individual frames are adapted to be projected at a given number per second by television stations in the form of television images at a different number of images per second.

In the United States, as well as in other countries, standard film speeds and the resultant number of film frames projected per second have been fixed for many years in the interest of uniformity. When a sound track is printed directly upon the edge of such a film, the established film speed must be maintained and cannot be altered without disturbing the faithful reproduction of the sound. In television the number of images transmitted per second has also been fixed in the interest of uniformity, this rate of television image transmission usually being directly related to the frequency of the standard electric supply locally available. Unfortunately, the standard rate of film frame projection, for historical reasons, differs from the standard rate of television image transmission, at least in the United States and many other countries, and this difference raises a problem in the transmission of sound movies over television. It is the purpose of my invention to overcome this problem.

As an example, in the United States standard 16 mm. sound motion picture film is adapted to be driven at a speed of 36 feet per minute or 7.2 inches per second, and 24 frames of the film are flashed onto the projection screen each second. In television in the United States, however, 30 images or frames are transmitted each second by television stations as standard, this standard being chosen because this frequency and the effective rate of transmission are related to the frequency of the standard U. S. 60-cycle A. C. power supply. The problem, therefore, in televising 16 mm. sound film in the United States is one of converting 24 frames of motion picture film per second into 30 television images or frames per second. Reducing these figures to the least common denominator shows that 5 television images should be produced for each 4 motion picture frames.

This has been accomplished in the past by means of complicated mechanical shutter arrangements or pulsating light sources such that alternate frames of the motion picture film are scanned three times by the television converter while intermediate frames are scanned only twice. It will be noted that this results in five television images being produced for each two motion picture frames, whereas the above ratio is 5:4. The reason for this 5:2 ratio instead of 5:4 is that in television images are transmitted by a method known as interlaced scanning, each television image being divided into a total of 525 substantially horizontal lines and each image or frame being transmitted in two parts. The first half of the image transmitted, or so-called field, consists of all even lines, which are transmitted in 1/60 of a second and the second half of the image or field comprises all the odd lines of the scanned image, which are transmitted during the next 1/60 of a second. Thus each field will include one-half of the total 525 lines or 262½ lines from its beginning to the start of the next field, and with interlaced scanning two successive fields make up a complete single television picture, hereinafter called an image or a frame.

In accordance with my invention I accomplish this 3:2 scanning of sound motion picture film for television transmission without the use of intermittent advance of the film and a pulsating light or the alternative complicated mechanical shutter arrangements such as have been used in the prior art, accomplishing this simply and expeditiously by means of a flying spot of light which scans the continuously moving motion picture film and varies the output of a cooperating photo-electric cell to produce a proportional output for transmission by the television station. It is to be understood, however, that my invention is not limited to such a 3:2 scanning, for which the following specific embodiment is described merely by way of example, but that in accordance with my invention any motion picture film adapted for projection at a given number of frames per second may be televised at a different number of television images per second. My invention will be more fully understood from the following description of one embodiment for 3:2 scanning when taken with the accompanying drawings, in which:

Figure 1:
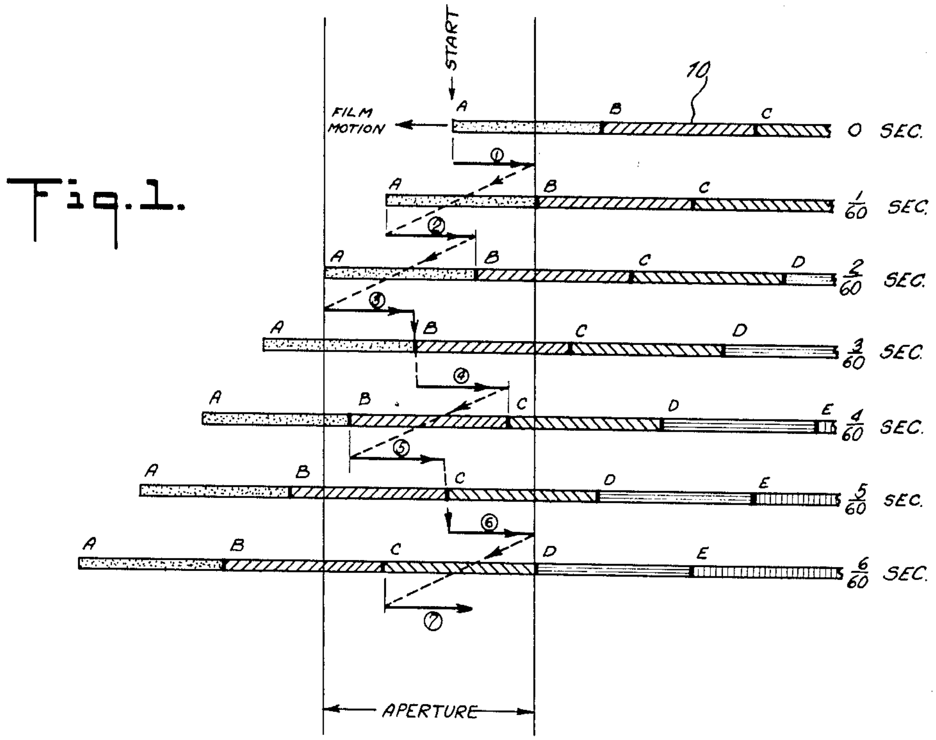
Fig. 1 shows diagrammatically the manner in which successive frames of the motion picture film are scanned in accordance with my invention.

In Fig. 1 is shown in successive lines from top to bottom a motion picture film 10 in motion at successive 1/60 of a second intervals, the motion being to the left as indicated by the arrow at the left of the top line. As an example, let this film 10 be a standard 16 mm. sound film which, as noted above, travels during projection at 36 feet per minute, or 7.2 inches per second. Each film frames within which the picture appears is 0.380 inch wide and 0.284 inch long. The distance between leading edges, or center lines, of adjacent frames is 0.300 inch, leaving a 0.016 inch margin or black area between adjacent frames as shown in Fig. 1. Successive film frames are indicated in Fig. 1 by successive letters, e. g., A, B, C, etc. In accordance with my invention a flying spot of light travels across the width of the motion picture frame very rapidly during the time of each television field in much the same manner that the corresponding electron beam moves in the cathode ray tube of the home receiver when receiving the transmitted picture. As pointed out above, this flying spot of light also moves but more slowly along the axis of the film motion so that 262½ lines are traversed or scanned on each motion picture frame during the transmission of a single television field. Thus the arrow marked 1 in Fig. 1 indicates a portion of the path of motion of the flying spot of light in a direction along the axis of the film 10, it being understood, of course, that this flying spot of light also moves rapidly across the width of the film (which, as seen in Fig. 1, is in a direction at right angles to the plane of the drawing) to produce the conventional raster made up of 262½ "horizontal" lines, as will be more apparent from Figs. 2 and 3.

While the flying spot of light is moving to the right through course 1, film 10 is moving to the left. Thus, during the first period of $\frac{1}{60}$ of a second in which the complete scanning of the first raster is accomplished, film 10 has moved 0.120 inch to the left and the flying spot trace has moved 0.164 inch to the right. Thus, although the last trace or scan of the raster ends only 0.164 inch to the right of the point at which the first trace started, the entire length of film frame A, 0.284 inch, has been travered due to the simultaneous movement of film 10 in the opposite direction. At the end of the scanning of the first raster, the flying spot is moved by suitable means so that it will resume scanning at the leading edge of the same film frame A once again, and will then travel in the course marked 2 in Fig. 1. During the ensuing $\frac{1}{60}$ of a second, the second raster of the flying spot tube is traversed by the flying spot of light, the spot of light traversing 262½ "horizontal" lines as before and again moving 0.164 inch to the right in course 2, film 10 simultaneously moving 0.120 inch to the left. Thus film frame A is scanned completely a second time in the second period of $\frac{1}{60}$ of a second.

During the third period of $\frac{1}{60}$ of a second, the film frame A is scanned a third time as the flying spot traverses course 3, this occurring during the third raster of the flying spot tube. The relationship of courses 1, 2 and 3 is such that portions of the first and second, and of the second and third, rasters overlie one another in the production of successive triple scans of the film frame A.

At the end of the third scan, the flying spot of light jumps in a direction opposite to that of the film movement and a distance of 0.016 inch from the point of completion of the third scan, this being the distance between adjacent frames, and thereupon commences a fourth scan along course 4 (in Fig. 1) beginning with the leading edge of the film frame B in order to make the fourth raster. During the fourth raster, the flying spot of light again traverses 262½ "horizontal" lines, the scanning trace again moving 0.164 inch to the right simultaneously with film 10 again moving 0.120 inch to the left during this fourth $\frac{1}{60}$ of a second. At the end of the fourth raster, the flying spot of light is again moved to the left in a manner similar to that which occurs between the first and second rasters so that the fifth raster starts coincident with the leading edge of the film frame B, and the fifth raster is then scanned during the fifth $\frac{1}{60}$ of a second. At the end of the fifth raster, the flying spot of light again jumps 0.016 inch in a direction opposite to that of the film movement, and thereupon begins at the start of the sixth period of $\frac{1}{60}$ second a scan which is applied to film frame C and is so far as raster position relative to the axial direction of the film movement is concerned a repetition of the scan in course 1 applied to film frame A. Hence, the raster movement cycle is complete upon completion of the fifth raster during the fifth $\frac{1}{60}$ of a second, and the raster movement cycle as a whole includes five scans applied to two frames, one of them being scanned thrice and one of them twice. Subsequent scans repeat this cycle. Thus, during the 6th, 7th, and 8th rasters, film frame C is scanned by the flying spot; during the 9th and 10th rasters film frame D is scanned; during the 11th, 12th, and 13th rasters frame E is scanned, etc.

The only difference between rasters Nos. 1 and 6 is that, since with interlaced scanning odd and even lines are scanned during successive rasters, if odd lines are scanned during raster No. 1, even lines must be scanned during raster No. 6, or vice versa. Thus only rasters Nos. 1, 11, 21, etc., are exact duplicates in all respects, as are rasters 2, 12, 22, etc., but rasters Nos. 1, 6, 11, 16, 21, etc., are the same so far as positioning of the raster in the film gate aperture and relative to the axial direction of the film movement is concerned as indicated above.

In utilizing these rasters as television images, according to my invention, the first television frame or image is made up of two fields successively scanned from film frame A (the 1st and 2nd rasters, above); the second television image is made up of one field scanned from film frame A and one field scanned from film frame B (the 3rd and 4th rasters); the third television image is made up of one field scanned from film frame B and one field scanned from film frame C (the 5th and 6th rasters); the fourth television image is made up of two fields scanned from the same film frame C (the 7th and 8th rasters); and so on. I have found that this does not distort the visual image since there is very little difference between adjacent frames of a motion picture film and no apparent visual distortion is produced by combining two fields taken from adjacent film frames to produce a composite television image instead of producing the composite television image from a single film frame.

Figure 2:
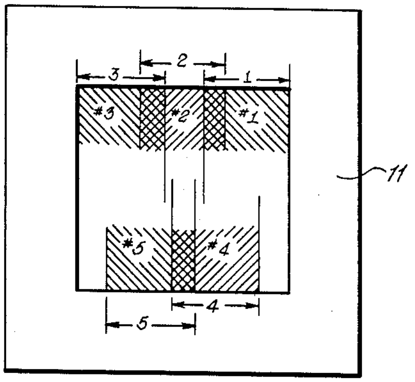
Fig. 2 shows the overlapping effective light rasters produced at the aperture of the film light gate to produce the scanning of Fig. 1.
Figures 3, 4, 5:
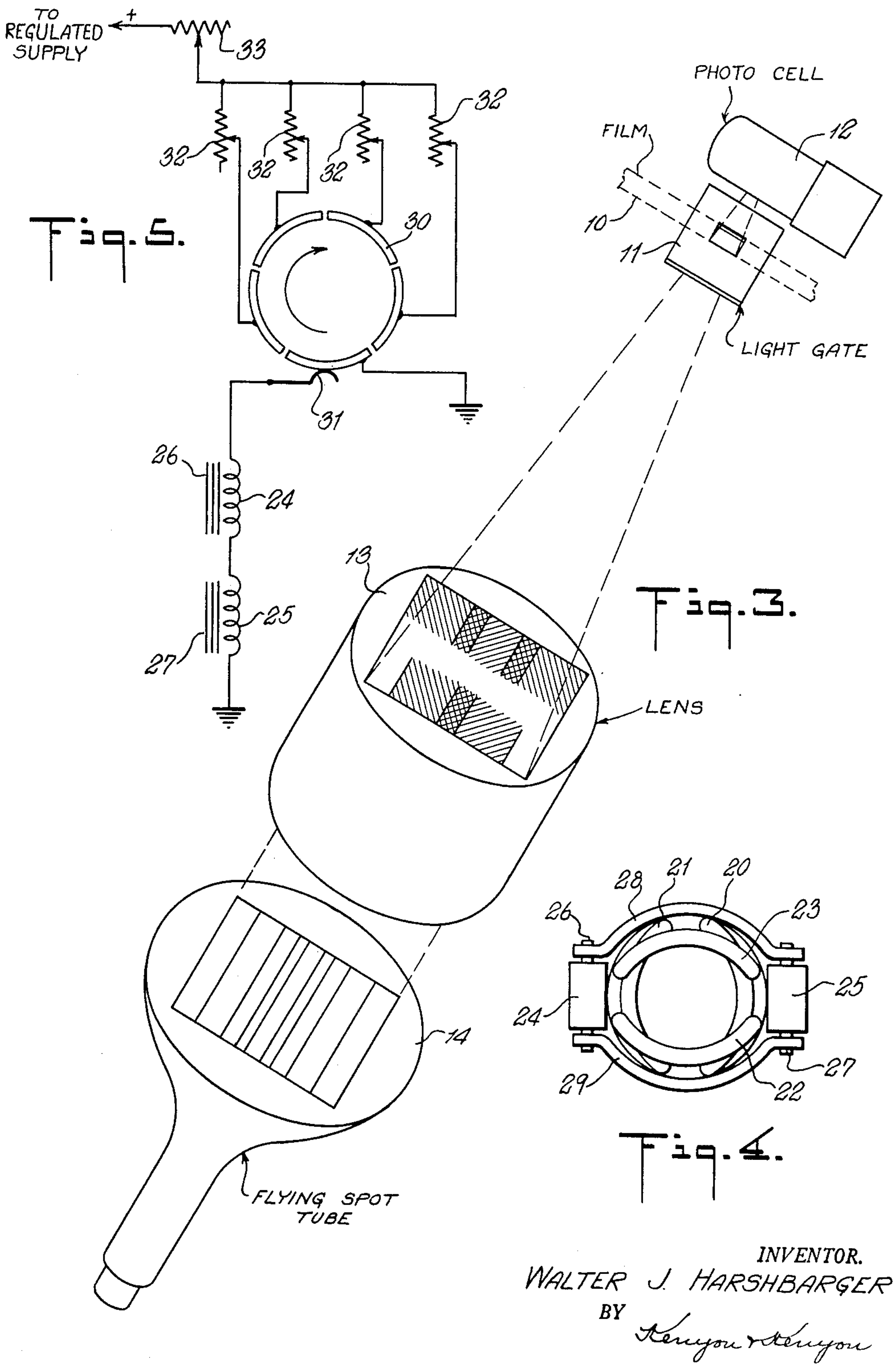
Fig. 3 illustrates the manner in which the rasters appearing on the face of a flying-spot tube are optically reduced in size and projected through the light gate or aperture for projection through the film onto the cooperating photo-electric cell.
Fig. 4 shows the manner in which the auxiliary control elements of Fig. 5 are positioned in accordance with my invention adjacent the conventional control elements of a flying-spot tube.
Fig. 5 illustrates one method of controlling the motion of the flying spot of light of the tube of Fig. 3 to produce the desired rasters.

In Fig. 2 is shown the light gate 11 over which the film 10 passes and through the aperture of which the flying spot of light passes to modify the output of the photocell 12 of Fig. 3. Within the aperture are shown the effective rasters projected there by the optical lens 13 of Fig. 3 from the actual rasters produced on the face of the flying spot tube 14 of Fig. 3. Each raster is made up of 262½ successive "horizontal" lines traversed by the flying spot of light during a $\frac{1}{60}$ of a second interval. In Fig. 2 the so-called "horizontal" direction of the effective raster is shown vertically in order that the motion of the flying spot with reference to the path of film motion as shown in Fig. 2 may be compared with those indicated in Fig. 1 directly above. Only a portion of each effective raster has been shown in order to make the drawing more clear but it will be noted that portions of rasters 1 and 2 overlie one another; portions of rasters 2 and 3 overlie one another; portions of rasters 4 and 5 overlie one another; and also that portions of rasters 1, 2 and 4; 2, 4 and 5; and 2, 3, and 5, respectively, overlie one another. The first flying spot of light "horizontal" trace of each effective raster shown in Fig. 2 occurs at the left edge of the raster and the motion of the flying spot of light for successive "horizontal" traces is toward the right during each raster.

In Fig. 3 is shown the manner in which the successive rasters appearing on the face of flying spot tube 14 are optically projected, and preferably reduced in size, by lens 13 to appear in the aperture of light gate 11 over which film 10, indicated by the dotted lines, passes. Photocell 12 is located on the other side of film 10 from light gate 11 to receive the light of the flying spot at any instant as modulated by the intensity of the film. It will, of course, be realized that in accordance with the usual principles of optics, if effective raster No. 1 is to appear at the right of the aperture of light gate 11, the corresponding No. 1 raster on the face of flying spot tube 14 appears at the extreme left with its right edge corresponding to the left edge of the effective raster appearing in the aperture of light gate 11.

A scanning raster may be made to appear on the face of a flying spot tube in the same manner that a corresponding trace is made to appear on the face of a conventional cathode ray tube, e. g., by applying suitable deflecting fields to the electron stream. In Fig. 4 is shown a plan view from above of one conventional method of producing a suitable deflecting field to provide a raster on the face of a flying spot tube together with a modification in accordance with my invention to produce the required plurality of rasters. Coils 20 and 21 constitute the conventional horizontal deflection coils and coils 22 and 23 constitute the conventional vertical deflection coils which are positioned around the neck of an electron beam tube, such as a cathode ray tube or the flying spot tube 14 of Fig. 3, to produce a desired trace or raster when supplied with suitable control potentials. In accordance with my invention I provide horizontal coils 20 and 21 with a suitable saw-tooth or trapezoidal voltage which will cause the flying spot to traverse the face of flying spot tube 14 262½ times during each 1/60 of a second, the peak magnitude of this applied potential being such that the "horizontal" trace of the flying spot when reduced by lens 13 will produce an effective horizontal raster trace 0.380 inch long in the aperture of light gate 11. Similarly, suitable supply voltages are conveniently applied to vertical deflection coils 22 and 23 at a lower frequency to move the successive traces or scans of each raster gradually to the left on the face of flying spot tube 14 and thus to the right in the aperture of light gate 11, the peak magnitude of these vertical saw-tooth or trapezoidal voltages being such that the effective movement of each series of traces during 1/60 of a second, or in other words, the width of one raster is 0.164 inch at the aperture of light gate 11. In accordance with my invention I provide and position auxiliary coils 24 and 25 as shown, these coils being wound around cores 26 and 27, respectively. Cores 26 and 27 are joined by means of yokes 28 and 29 to complete the magnetic circuit. Coils 24 and 25 are postioned such that their fields will control the deflection of the electron beam similarly to the fields of vertical deflection coils 22 and 23. In accordance with my invention each raster appearing on the face of flying spot tube 14 is produced by the conventional applied voltages as described above but the position of each raster on the face of tube 14 is further determined by means of control potentials applied to my auxiliary deflecting coils 24 and 25.

Figure 7:
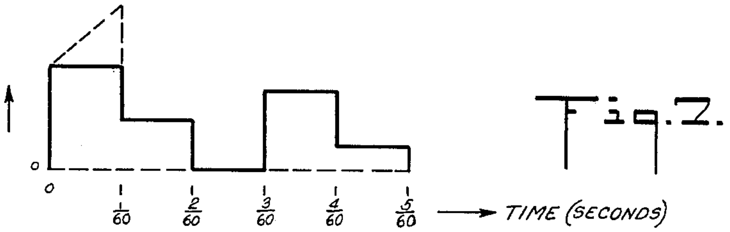
Figs. 7 and 8 are wave forms with respect to time illustrating the manner in which the desired rasters may be produced.

One means of deriving the required control potentials for coils 24 and 25 to position the rasters as shown in Figs. 1, 2, and 3 is illustrated in Fig. 5. This comprises the use of a segmented commutator 30 feeding a brush or contactor 31, auxiliary deflection coils 24 and 25 being connected in series between contactor 31 and ground. Commutator 30 has five segments, one for each raster. One segment is connected to ground and each of the other four segments is connected in series through a variable resistor 32 specific to its segment alone and a second variable resistor 33 common to all the segments to a positive regulated voltage supply. Each of variable resistors 32 is adjusted to produce a desired step voltage for the individual raster corresponding to the respective commutator segment, as best illustrated by the wave form of Fig. 7. Adjustment of each variable resistor 32 thus determines the starting point or right-hand edge of each raster on the face of flying spot tube 14 of Fig. 3. The length of the individual segments of commutator 30 and its speed of rotation are made such that contactor 31 engages each segment for a period of 1/60 of a second. To produce the rasters shown in Figs. 1, 2, and 3, the individual variable resistors 32 are adjusted such that an output is produced at contactor 31 as shown by the full lines in Fig. 7, which is a wave form with respect to time of the step voltages applied from the positive regulated supply to auxiliary deflection coils 24 and 25. As indicated in Fig. 7 by the dotted lines for the first raster only, an additional deflecting force due to conventional vertical deflection coils 22 and 23 (Fig. 4) is superimposed upon the force produced by each step voltage applied to deflection coils 24 and 25. The overall effective deflection voltage for the electron beam in the flying spot tube 14 (Fig. 3) is thus as indicated by the dotted line in Fig. 7. Similar dotted lines, adding an effective saw tooth to the respective step voltage could, of course, also be added to the step voltage of each of the other rasters to show the effective deflecting potentials. Variable resistor 33 common to all the segments to which a step voltage is applied with the exception of that segment which is grounded is included in order to compensate for film shrinkage since by its adjustment all step voltages are correspondingly reduced or increased relative to ground potential. While one commutator segment has been shown grounded, this is not, of course, necessary and all segments could have a positive voltage if desired to produce any suitable step voltage relation between the respective commutator segments.

Figure 6:
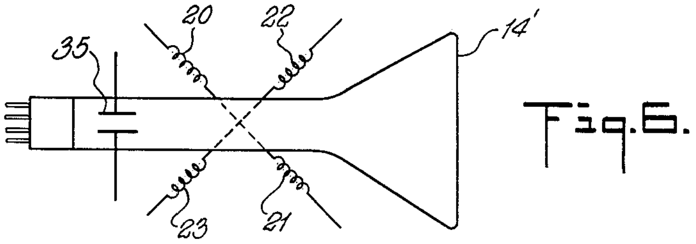
Fig. 6 shows diagrammatically alternative auxiliary control elements for use in accordance with my invention to vary the path of the flying spot of light to produce the desired rasters.

In Fig. 6 is shown still another method of applying the necessary control voltages to a flying spot tube in order to provide the desired rasters on the face thereof in accordance with my invention. Here flying spot tube 14' is provided with the conventional horizontal deflecting coils 20 and 21 and vertical deflecting coils 22 and 23 as above. However, a set of auxiliary electrostatic deflection plates 35 are built in the neck of tube 14', preferably fairly close to the electron gun assembly adjacent the base, the step voltages from contactor 31 of Fig. 5 then being applied to one of auxiliary vertical deflecting plates 35 while the other is grounded. As before, conventional deflection horizontal coils 20 and 21 and vertical deflection coils 22 and 23 are fed with conventional saw-tooth voltages to produce the desired raster upon the face of flying spot tube 14'. It should again be noted that the length of each raster is controlled by the saw tooth control voltage applied to vertical deflection coils 22 and 23, the width of each raster is controlled by the saw tooth control voltage applied to horizontal deflection coils 20 and 21, and the vertical position of the raster on the face of flying spot tube 14' is controlled by the magnitude of the step voltage applied at that instant to the auxiliary deflection plates 35.

It will be apparent, of course, to those skilled in the art that electromagnetic coils 20, 21, 22, and 23 of Figs. 4 and 6 may be replaced by suitable conventional electrostatic deflection plates in the same manner that auxiliary electromagnetic coils 24 and 25 of Fig. 4 have been replaced by auxiliary electrostatic deflection plates 35 in Fig. 6. Furthermore, while auxiliary deflection coils 24 25 have been shown as connected between a positive source of potential and ground in Fig. 5 and auxiliary deflection plates 35 have been similarly described as connected between a positive source of potential and ground in Fig. 6, it will also be obvious to those skilled in the art that if desired a push-pull circuit may be utilized for driving the deflection means instead of connecting one terminal of each deflection means to ground.

Figure 8:
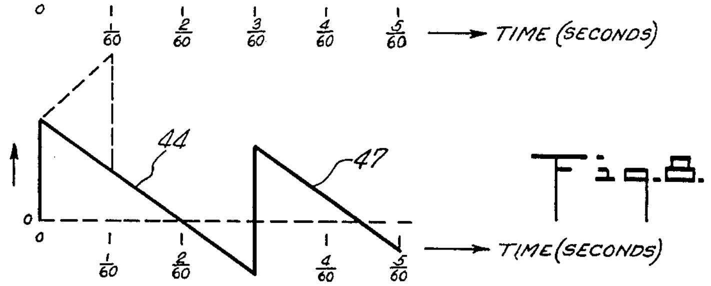

It will also be apparent to those skilled in the art that if desired suitably timed 20- and 30-cycle saw-tooth voltages may be substituted for the step voltages shown in Fig. 7 and produced by the mechanical commutator of Fig. 5. Such saw tooths are shown in Fig. 8. In utilizing these saw tooths it will, of course, be necessary to increase the magnitude of the saw tooth wave form applied to the conventional vertical deflecting elements of flying spot tube 14 so that the overall vertical deflecting force will remain the same as indicated in Fig. 8 by the dotted lines for the first raster only. Comparison of these dotted lines with those of Fig. 7 shows that the overall deflecting force is exactly the same.

Figure 9:
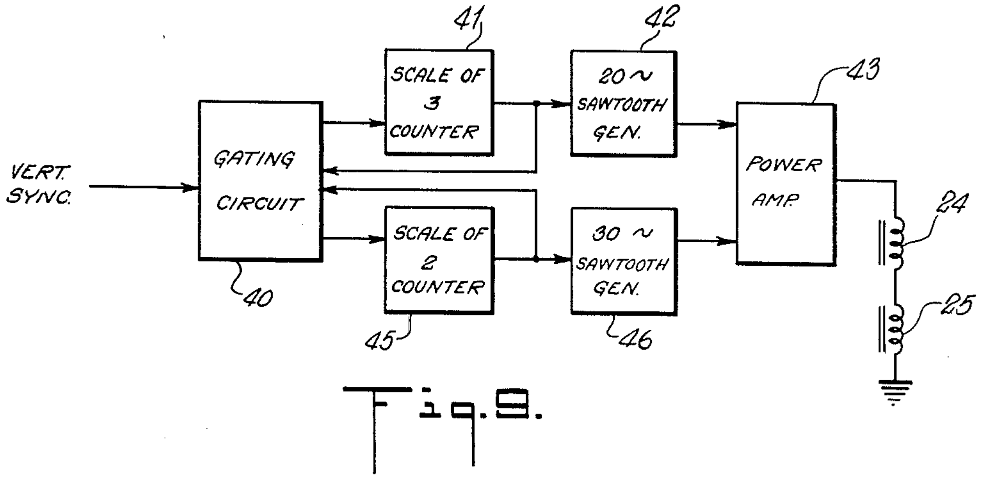
Fig. 9 shows another and electronic method of controlling the motion of the flying spot of light of the tube of Fig. 3 to produce the desired rasters.

One method of deriving the timed 20- and 30-cycle saw tooths of Fig. 8 is shown in Fig. 9 wherein gating circuit 40 is driven from the 60-cycle vertical synchronizing or sync pulses of the transmitting unit. Gating circuit 40 may, for example, comprise two electron switch tubes so connected that when one is conducting, the other is nonconducting, and vice versa. The first vertical sync pulse applied to gating circuit 40 turns on or renders conducting one of its electronic switch tubes, which in turn starts a scale-of-3 counter 41 in operation. The second and third vertical sync pulses which occur at successive 1/60 of a second intervals are also passed by the above conducting tube of gating circuit 40 to scale-of-3 counter 41, and the latter produces an output in response to the third vertical sync pulse. This output of counter 41 triggers 20-cycle saw-tooth generator 42 into operation to produce a single 20-cycle saw tooth therefrom, which is amplified in power amplifier 43 and applied as saw tooth 44 (Fig. 8) to auxiliary deflection coils 24 and 25. The same output of counter 41 which initiates the operation of 20-cycle saw-tooth generator 42 may also be fed back to gating circuit 40 to render the above-mentioned conducting tube non-conducting and the second of its electronic switch tubes conducting. The fourth and fifth vertical sync pulses are then passed by this second electronic switch tube, the fourth sync pulse triggering scale-of-2 counter 45 into operation, and the fifth sync pulse producing an output from counter 45 which then triggers 30-cycle saw-tooth generator 46 into operation to produce a single 30-cycle saw-tooth output therefrom which is then amplified by means of power amplifier 43 and applied as saw tooth 47 (Fig. 7) to auxiliary deflection coils 24 and 25. The same output of counter 45 which triggered saw-tooth generator 46 into operation to produce a single 30-cycle saw-tooth output therefrom is also connected back to gating circuit 40 to render the second of its electronic switch tubes non-conducting again and render the first of its switch tubes conducting. Thus the successive sixth, seventh and eighth vertical sync pulses will be passed by the first switch tube of gating circuit 40 to operate scale-of-3 counter 41, with the eighth vertical sync pulse triggering 20-cycle saw-tooth generator 42 into operation again to produce another single 20-cycle saw tooth at its output, and at the same time switching gating circuit 40 such that the ninth and tenth vertical sync pulses will be conducted through the second of its switch tubes to scale-of-2 counter 45. This cycle then continues as long as sync pulses are fed to gating circuit 40 to produce successive 20- and 30-cycle saw tooths synchronized with the station vertical sync pulses for application to auxiliary deflection coils 24 and 25 as shown.

Numerous additional embodiments of the above-disclosed principles will occur to those skilled in the art, and no attempt has here been made to exhaust such possibilities. For instance, while I have shown auxiliary deflection elements in Figs. 4 and 6 and have described the various raster positioning control voltages as applied to these elements, it will of course be apparent that, if desired, such control voltages may be applied instead to the conventional deflection elements shown in Figs. 4 and 6, and the auxiliary elements omitted. For example, the raster positioning control voltages shown in Figs. 7 and 8 might be applied to the deflection amplifier associated with the conventional deflecting elements, or applied to the centering voltage circuit for the tube.

Also, while I have shown only one method for correcting for film shrinkage, other methods are possible. For example, instead of varying the potential supplied to the raster positioning control commutator segments as shown in Fig. 5, the potentials supplied to sawtooth generators 42 and 46 may be varied for the same purpose, e. g., decreasing the distance between leading edges of successive rasters to correct for the decreased spacing between the leading edges of the film frames.

It is to be understood that by the term "gate" as used in the specification and claims, I mean any mechanism for guiding and positioning the film properly for the scanning thereof by the passage of the flying spot of light therethrough.

What I claim is:

1. The method of scanning motion picture film which is subject to shrinkage or expansion from its normal dimensions with a flying spot of light from a cathode ray tube having deflecting elements and independent auxiliary deflection means, which comprises moving said film past a gate at substantially uniform speed, applying a first positioning voltage to the deflecting elements to position the flying spot at the leading edge of a frame of said film, applying vertical and horizontal sweep voltages to the deflecting elements to cause the spot to traverse said frame, starting at said leading edge thereof, in a series of parallel transverse pathways successively displaced relative to the gate in a direction opposite to that in which the film is moving, upon completion of this complete traverse of said frame applying a second positioning voltage of different magnitude from that of the first positioning voltage to the auxiliary deflection means to place said spot in the position at said gate which would be occupied by the leading edge of said frame if the moving film were of normal dimensions, again applying horizontal and vertical sweep voltages to the deflecting elements to cause the spot to retraverse said frame of said film in like manner, and changing the magnitudes of each of said positioning voltages proportionally to a length change in film dimensions owing to shrinkage or expansion, whereby the commencement of each scanning of said frame is adjusted to compensate for changes in length of the film due to shrinkage or expansion thereof.

2. The method of scanning motion picture film which is subject to shrinkage or expansion from its normal dimensions with a flying spot of light from a cathode ray tube having deflecting elements and independent auxilitry deflection means, which comprises moving said film past a gate of substantially uniform speed, applying a first positioning voltage to the deflecting elements to position the flying spot at the leading edge of a frame of said film, applying vertical and horizontal sweep voltages to the deflecting elements to cause the spot to traverse said frame, starting at said leading edge thereof, in a series of parallel transverse pathways successively displaced relative to the gate in a direction opposite to that in which the film is moving, upon completion of this complete traverse of said frame applying a second positioning voltage of different magnitude from that of the first positioning voltage to said auxiliary deflection means to place said spot in the position at said gate which would be occupied by the leading edge of the next successive frame if the moving film were of normal dimensions, again applying horizontal and vertical sweep voltages to the deflecting elements to cause the spot to traverse said next successive frame of said film in like manner, and changing the magnitudes of each of said positioning voltages proportionally to a length change in film dimensions owing to shrinkage or expansion, whereby the commencement of the scanning of each frame is adjusted to compensate for changes in length of the film due to shrinkage or expansion thereof.

3. The method of scanning motion picture film which is subject to shrinkage or expansion from its normal dimensions with a flying spot of light from a cathode ray tube having deflecting elements and independent auxiliary deflection means, which comprises moving said film past a gate at substantially uniform speed, applying a first positioning voltage to the deflecting elements to position the flying spot at the leading edge of a frame of said film, applying vertical and horizontal sweep voltages to the deflecting elements to cause the spot to traverse said frame, starting at said leading edge thereof, in a series of parallel traverse pathways successively displaced relative to the gate in a direction opposite to that in which the film is moving, upon completion of this complete traverse of said frame applying a second positioning voltage of different magnitude from that of the first positioning voltage to said auxiliary deflection means to place said spot in the position at said gate which would be occupied by the leading edge of said frame if the moving film were of normal dimensions, again applying horizontal and vertical sweep voltages to the deflecting elements to cause the spot to retraverse said frame of said film in like manner, and reducing the difference between the magnitudes of said positioning voltages proportionally to a length change in film dimensions owing to shrinkage thereof, whereby the commencement of each scanning of said frame is adjusted to compensate for changes in length of the film due to shrinkage thereof.

4. The method of scanning motion picture film which is subject to shrinkage or expansion from its normal dimensions with a flying spot of light from a cathode ray tube having deflecting elements and independent auxiliary deflection means, which comprises moving said film past a gate at substantially uniform speed, applying a first positioning voltage to the deflecting elements to position the flying spot at the leading edge of a frame of said film, applying vertical and horizontal sweep voltages to the deflecting elements to cause the spot to traverse said frame, starting at said leading edge thereof, in a series of parallel transverse pathways successively displaced relative to the gate in a direction opposite to that in which the film is moving, upon completion of this complete traverse of said frame applying a second positioning voltage of different magnitude from that of the first positioning voltage to said auxiliary deflection means to place said spot in the position at said gate which would be occupied by the leading edge of the next successive frame if the moving film were of normal dimensions, again applying horizontal and vertical sweep voltages to the deflecting elements to cause the spot to traverse said next successive frame of said film in like manner, and reducing the difference between the magnitudes of said positioning voltages proportionally to a length change in film dimensions owing to shrinkage thereof, whereby the commencement of the scanning of each frame is adjusted to compensate for changes in length of the film due to shinkage thereof.

References Cited in the file of this patent

UNITED STATES PATENTS

| | | |
|---|---|---|
| 2,250,479 | Goldmark | July 29, 1941 |
| 2,261,848 | Goldmark | Nov. 4, 1941 |
| 2,291,723 | Jensen | Aug. 4, 1942 |
| 2,523,156 | Somers | Sept. 19, 1950 |
| 2,525,891 | Garman et al. | Oct. 17, 1950 |
| 2,569,280 | Bedford | Sept. 25, 1951 |
| 2,590,281 | Sziklai et al. | Mar. 25, 1952 |

FOREIGN PATENTS

| | | |
|---|---|---|
| 608,939 | Great Britain | Sept. 23, 1948 |